US012641445B2

(12) United States Patent
Oduwaiye et al.

(10) Patent No.: US 12,641,445 B2
(45) Date of Patent: May 26, 2026

(54) VORONOI TESSELATION FOR OPTIMIZING BASE STATION DEPLOYMENT IN WIRELESS NETWORKS

(71) Applicant: Charter Communications Operating, LLC, St. Louis, MO (US)

(72) Inventors: Muhib T. Oduwaiye, Aurora, CO (US); Pareshkumar Panchal, Highlands Ranch, CO (US); Noah Yoder Polizzotto, Castle Rock, CO (US); Anthony Steven Preston, Broomfield, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 290 days.

(21) Appl. No.: 18/582,088

(22) Filed: Feb. 20, 2024

(65) Prior Publication Data

US 2025/0267470 A1     Aug. 21, 2025

(51) Int. Cl.
| | | |
|---|---|---|
| *H04W 16/18* | (2009.01) |
| *H04W 16/24* | (2009.01) |
| *H04W 24/02* | (2009.01) |
| *H04W 64/00* | (2009.01) |
| *H04W 84/02* | (2009.01) |
| *H04W 88/08* | (2009.01) |
| *H04W 88/18* | (2009.01) |

(52) U.S. Cl.
CPC ........... *H04W 16/18* (2013.01); *H04W 16/24* (2013.01); *H04W 24/02* (2013.01); *H04W*

*64/003* (2013.01); *H04W 84/02* (2013.01); *H04W 88/08* (2013.01); *H04W 88/18* (2013.01)

(58) Field of Classification Search
CPC ..... G06T 17/005–30; H04L 41/14–26; H04W 16/02–32; H04W 24/02–10; H04W 64/003–006; H04W 68/005–12; H04W 84/02–16; H04W 88/08–188; H04W 92/02–045; H04W 92/12–14
See application file for complete search history.

(56) References Cited

U.S. PATENT DOCUMENTS

| | | | | |
|---|---|---|---|---|
| 2024/0056830 A1* | 2/2024 | Bhatnagar | ............. | H04W 16/18 |
| 2024/0196200 A1* | 6/2024 | Dhaka | ................... | H04W 24/02 |

* cited by examiner

*Primary Examiner* — Timothy J Weidner
(74) *Attorney, Agent, or Firm* — Dority & Manning, P.A.

(57) ABSTRACT

Information indicative of a plurality of sub-areas of a geographic area can be obtained. Each sub-area is demarcated by a corresponding enclosed border. For each sub-area a set of internal borders that are successively nested within the enclosed border of the sub-area can be identified. For each sub-area, a set of points can be selected from points located along the set of internal borders. For each sub-area, based on the set of points, a tessellation process can be performed to tessellate the sub-area into a plurality of polygons within the enclosed border, each polygon of the plurality of polygons being representative of a corresponding candidate base station deployment site. Tracking Area Code (TAC) information indicative of a plurality of TACs assigned to the plurality of candidate base station deployment sites can be obtained.

20 Claims, 7 Drawing Sheets

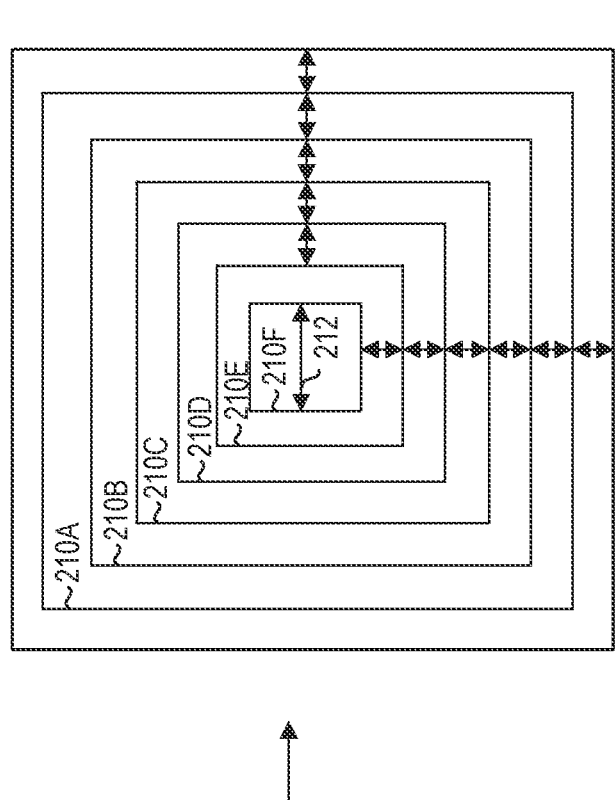
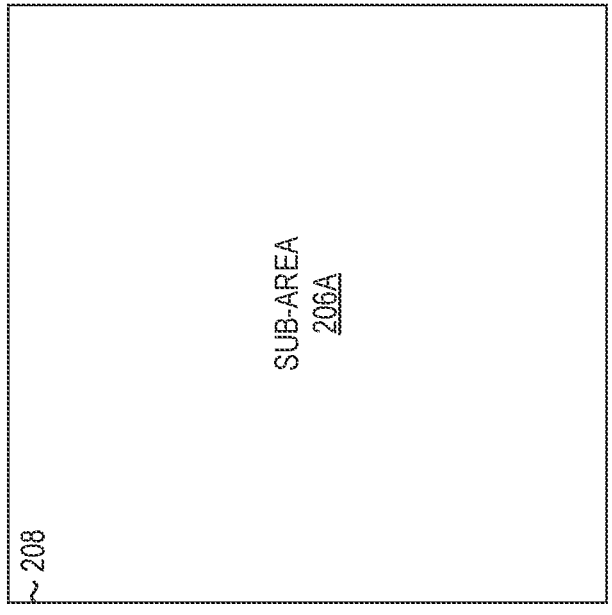
*FIG. 2B*

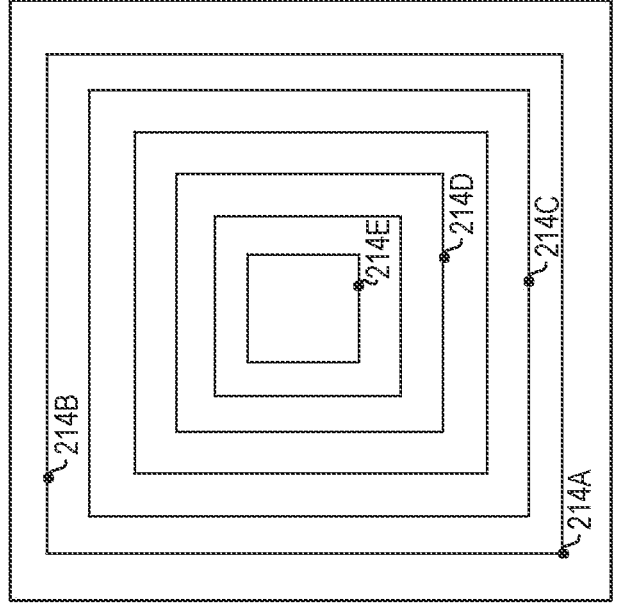
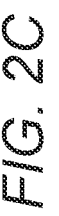
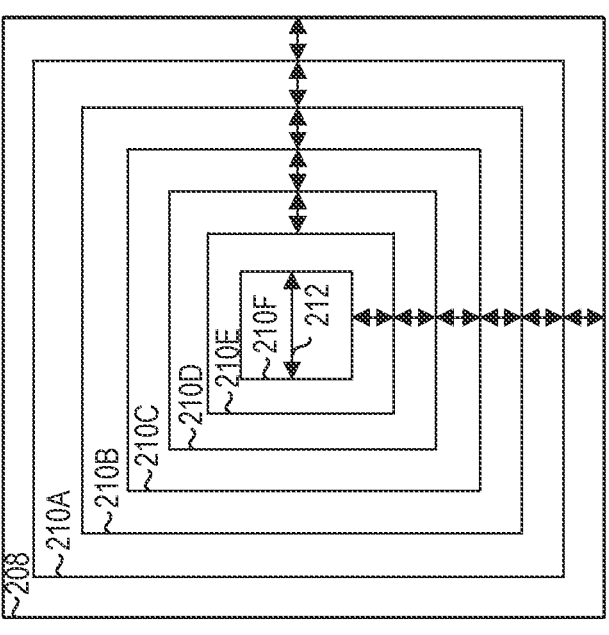
*FIG. 2C*

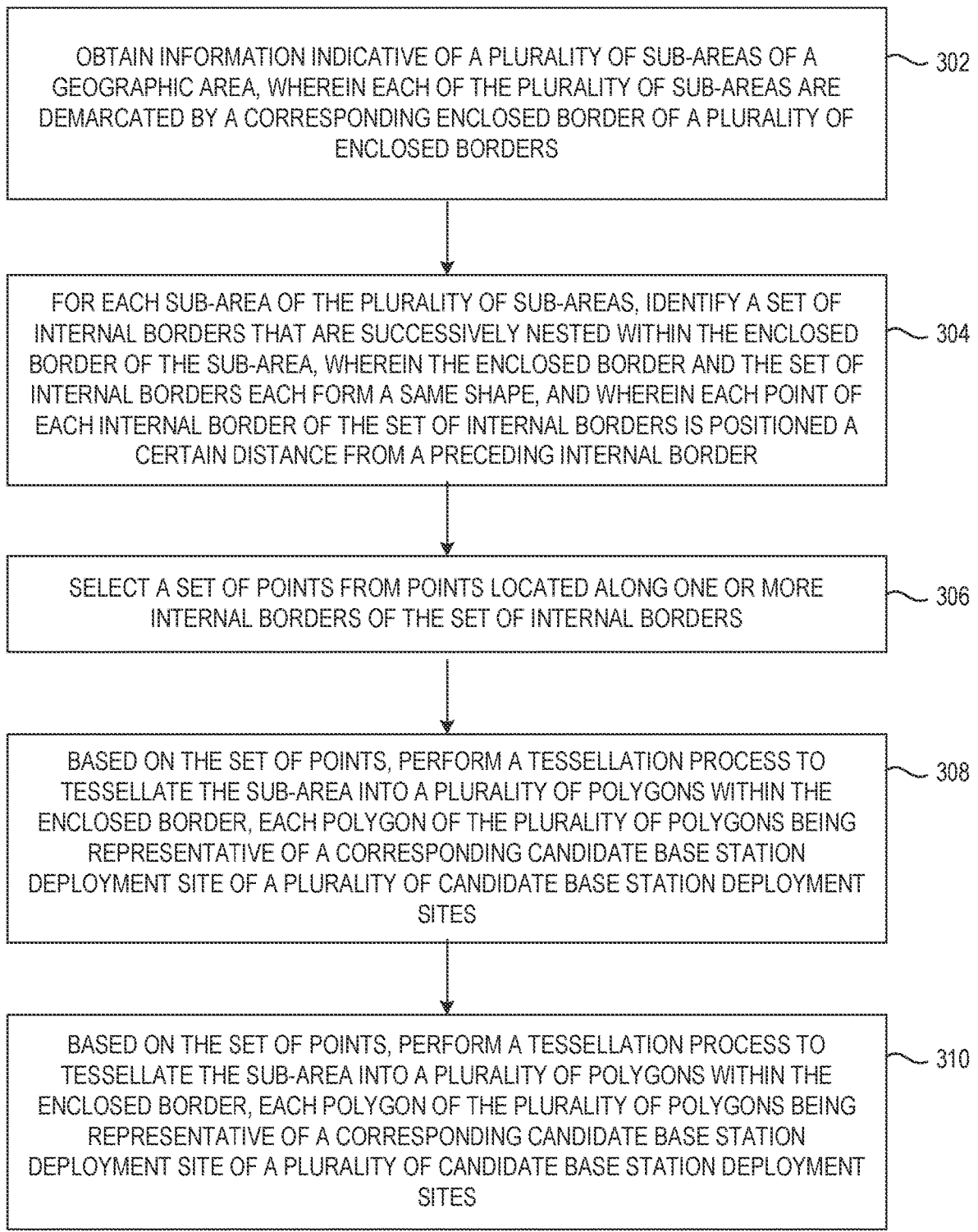

OBTAIN INFORMATION INDICATIVE OF A PLURALITY OF SUB-AREAS OF A GEOGRAPHIC AREA, WHEREIN EACH OF THE PLURALITY OF SUB-AREAS ARE DEMARCATED BY A CORRESPONDING ENCLOSED BORDER OF A PLURALITY OF ENCLOSED BORDERS — 302

FOR EACH SUB-AREA OF THE PLURALITY OF SUB-AREAS, IDENTIFY A SET OF INTERNAL BORDERS THAT ARE SUCCESSIVELY NESTED WITHIN THE ENCLOSED BORDER OF THE SUB-AREA, WHEREIN THE ENCLOSED BORDER AND THE SET OF INTERNAL BORDERS EACH FORM A SAME SHAPE, AND WHEREIN EACH POINT OF EACH INTERNAL BORDER OF THE SET OF INTERNAL BORDERS IS POSITIONED A CERTAIN DISTANCE FROM A PRECEDING INTERNAL BORDER — 304

SELECT A SET OF POINTS FROM POINTS LOCATED ALONG ONE OR MORE INTERNAL BORDERS OF THE SET OF INTERNAL BORDERS — 306

BASED ON THE SET OF POINTS, PERFORM A TESSELLATION PROCESS TO TESSELLATE THE SUB-AREA INTO A PLURALITY OF POLYGONS WITHIN THE ENCLOSED BORDER, EACH POLYGON OF THE PLURALITY OF POLYGONS BEING REPRESENTATIVE OF A CORRESPONDING CANDIDATE BASE STATION DEPLOYMENT SITE OF A PLURALITY OF CANDIDATE BASE STATION DEPLOYMENT SITES — 308

BASED ON THE SET OF POINTS, PERFORM A TESSELLATION PROCESS TO TESSELLATE THE SUB-AREA INTO A PLURALITY OF POLYGONS WITHIN THE ENCLOSED BORDER, EACH POLYGON OF THE PLURALITY OF POLYGONS BEING REPRESENTATIVE OF A CORRESPONDING CANDIDATE BASE STATION DEPLOYMENT SITE OF A PLURALITY OF CANDIDATE BASE STATION DEPLOYMENT SITES — 310

*FIG. 3*

VORONOI TESSELATION FOR OPTIMIZING BASE STATION DEPLOYMENT IN WIRELESS NETWORKS

BACKGROUND

Modern wireless networks are implemented with distributed networks of base stations (e.g., small cells, etc.) and other network infrastructure. In some networks, base stations are grouped and identified with Tracking Area Codes (TACs). Each TAC can identify a set of base stations, or "small cells," located within the same geographic area. TACS can be utilized to enable paging for mobile devices in idle states. More specifically, to perform a paging procedure, the network can determine a TAC associated with the last base station to communicate with the mobile device. The network can then search for the mobile device based on the TAC as per the configuration of local or global paging, along with the tracking area list.

SUMMARY

Implementations described herein utilize Voronoi tessellation for optimizing base station deployment in wireless networks. Specifically, a computing system associated with a network operator can obtain information indicative of a plurality of sub-areas of a geographic area, each demarcated by an enclosed border. The computing system can identify points within each sub-area. The computing system can perform a tessellation process based on the points to tessellate the sub-area into a plurality of polygons. Each of the polygons can represent a corresponding candidate base station deployment site. A TAC can be sequentially assigned to each deployment site.

In one implementation, a method is provided. The method includes obtaining, by a computing system comprising one or more processor devices, information indicative of a plurality of sub-areas of a geographic area, wherein each of the plurality of sub-areas are demarcated by a corresponding enclosed border of a plurality of enclosed borders. The method includes, for each sub-area of the plurality of sub-areas, identifying, by the computing system, a set of internal borders that are successively nested within the enclosed border of the sub-area, wherein the enclosed border and the set of internal borders each form a same shape, and wherein each point of each internal border of the set of internal borders is positioned a certain distance from a preceding internal border. The method includes, for each sub-area of the plurality of sub-areas, selecting, by the computing system, a set of points from points located along one or more internal borders of the set of internal borders. The method includes, for each sub-area of the plurality of sub-areas, based on the set of points, performing, by the computing system, a tessellation process to tessellate the sub-area into a plurality of polygons within the enclosed border, each polygon of the plurality of polygons being representative of a corresponding candidate base station deployment site of a plurality of candidate base station deployment sites. The method includes, for each sub-area of the plurality of sub-areas, obtaining, by the computing system, Tracking Area Code (TAC) information indicative of a plurality of TACs assigned to the plurality of candidate base station deployment sites.

In another implementation, a computing system is provided. The computing device includes a memory, and processor device(s) coupled to the memory. The processor device(s) are to obtain information indicative of a plurality of sub-areas of a geographic area, wherein each of the plurality of sub-areas are demarcated by a corresponding enclosed border of a plurality of enclosed borders. The processor device(s) are further to, for each sub-area of the plurality of sub-areas, identify a set of internal borders that are successively nested within the enclosed border of the sub-area, wherein the enclosed border and the set of internal borders each form a same shape, and wherein each point of each internal border of the set of internal borders is positioned a certain distance from a preceding internal border. The processor device(s) are further to, for each sub-area of the plurality of sub-areas, select a set of points from points located along one or more internal borders of the set of internal borders. The processor device(s) are further to, for each sub-area of the plurality of sub-areas, based on the set of points, perform a tessellation process to tessellate the sub-area into a plurality of polygons within the enclosed border, each polygon of the plurality of polygons being representative of a corresponding candidate base station deployment site of a plurality of candidate base station deployment sites. The processor device(s) are further to, for each sub-area of the plurality of sub-areas, obtain Tracking Area Code (TAC) information indicative of a plurality of TACs assigned to the plurality of candidate base station deployment sites.

In another implementation, a non-transitory computer-readable storage medium is provided. The non-transitory computer-readable storage medium includes executable instructions to cause a processor device to obtain information indicative of a plurality of sub-areas of a geographic area, wherein each of the plurality of sub-areas are demarcated by a corresponding enclosed border of a plurality of enclosed borders. The instructions further cause the processor device(s) to, for each sub-area of the plurality of sub-areas, identify a set of internal borders that are successively nested within the enclosed border of the sub-area, wherein the enclosed border and the set of internal borders each form a same shape, and wherein each point of each internal border of the set of internal borders is positioned a certain distance from a preceding internal border. The instructions further cause the processor device(s) to, for each sub-area of the plurality of sub-areas, select a set of points from points located along one or more internal borders of the set of internal borders. The instructions further cause the processor device(s) to, for each sub-area of the plurality of sub-areas, based on the set of points, perform a tessellation process to tessellate the sub-area into a plurality of polygons within the enclosed border, each polygon of the plurality of polygons being representative of a corresponding candidate base station deployment site of a plurality of candidate base station deployment sites. The instructions further cause the processor device(s) to, for each sub-area of the plurality of sub-areas, obtain Tracking Area Code (TAC) information indicative of a plurality of TACs assigned to the plurality of candidate base station deployment sites.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2B illustrates a set of internal borders applied to a geographic sub-area of the geographic area of FIG. 2A according to some implementations of the present disclosure.

FIG. 2C illustrates a plurality of points selected from points along the set of internal borders of FIG. 2B according to some implementations of the present disclosure.

FIG. 3 depicts a flow chart diagram of an example method to perform Voronoi tessellation for optimizing base station deployment in wireless networks according to some implementations of the present disclosure.

DETAILED DESCRIPTION

Figure 1:
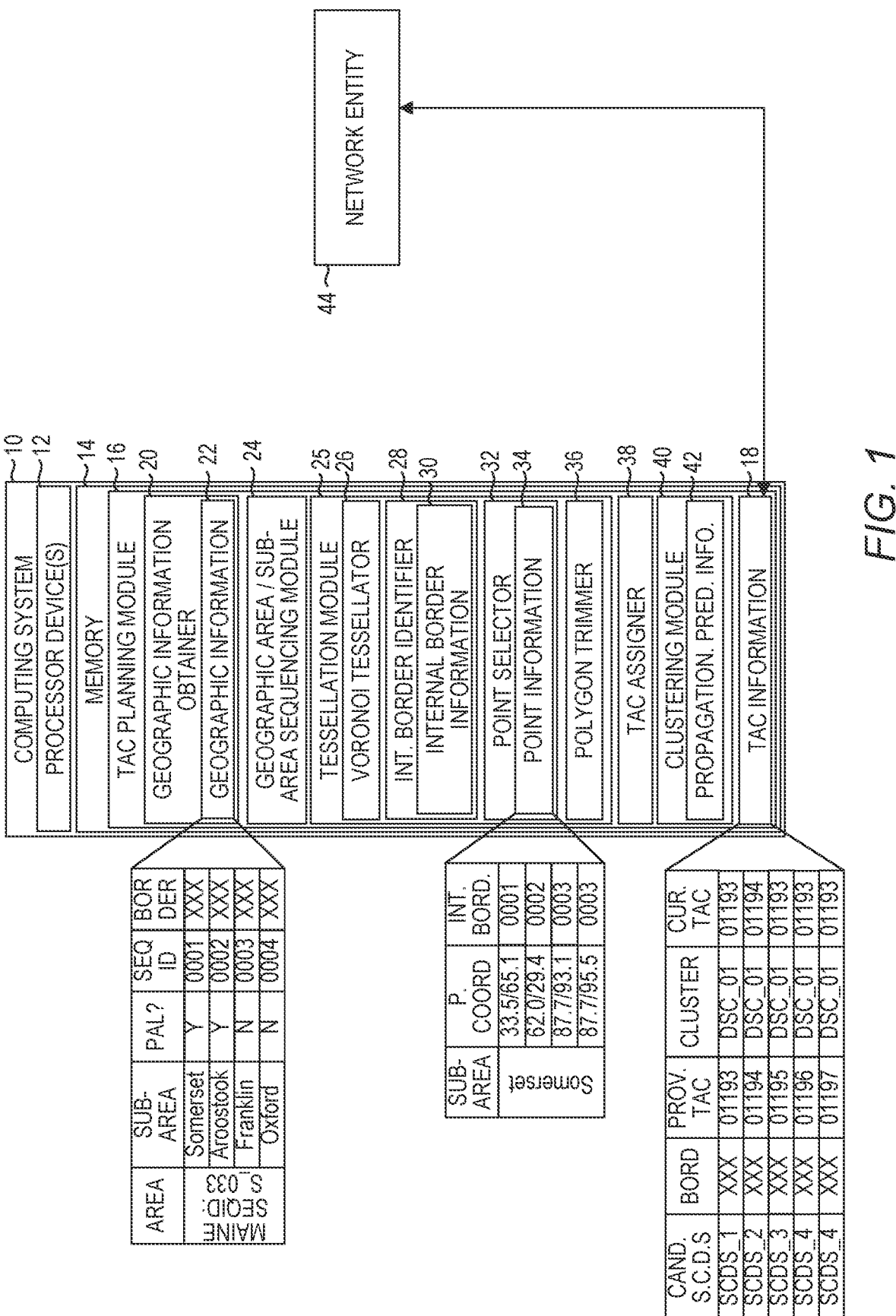
FIG. 1 is a block diagram of an environment suitable for implementing Voronoi tessellation for optimizing base station deployment in wireless networks according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Modern wireless networks are implemented with distributed networks of base stations and other network infrastructure. In some networks, base stations such as small cells are grouped and identified with Tracking Area Codes (TACs). More specifically, TACs can be associated to particular geographic areas, and each small cell within the geographic area can be mapped to the associated TAC. TACS can be utilized to enable paging for mobile devices in idle states. To perform a paging procedure, the network can track the TAC of the last small cell to which the mobile device was assigned. The network can then search for the mobile device based on the TAC.

As a mobile device moves between geographic areas associated with different TACs, the TAC being tracked for the mobile device can be updated. In this manner, the network can ensure that the TAC being tracked for the mobile device accurately reflects the last base station to which the mobile device was assigned. However, "larger" TACs with larger quantities of assigned base stations can experience greater numbers of paging discards due to capacity limitations of the air interface. When a page is discarded, a receiving mobile device may fail to transition from the idle state until a subsequent page is received. Callers attempting to reach the paged device receive a "user not reachable" message until the paging process is successfully completed, thus substantially delaying the reception of what is potentially critical information. Conversely, undersaturated tracking areas (e.g., tracking areas with very few base stations) can lead to frequent TAC updates, which in turn utilizes substantial network signaling capacity. Thus, TAC planning must establish TACs that are optimally designed to account for a current and future number of cells per TAC.

TAC planning is the process by which TACs are established within geographic areas. A primary goal of TAC planning is to ensure that TACs are neither "under-dimensioned"/"under-utilized" nor "overloaded" in the future. Conventionally, TAC planning is performed manually by network operators based on population data. Specifically, population data such as census block data can be used by network operators to predict a concentration of network users and/or base stations within a given geographic area. Based on the concentration(s), the network operators can determine a size, shape, and/or quantity of TACs within a given geographic area. For example, given a rural county with low population density, a network operator may decide to only establish a small number of TACs within the county. Conversely, given an urban county that includes a major metropolitan area with high population density, a network operator may establish a greater number of TACS within the county.

Modifying an established TAC plan to add additional TACs can be prohibitively difficult, as TACs are established sequentially. Due to this limitation, network operators must accurately account for future population growth and increased numbers of base stations within a given geographic area when performing the TAC planning process. If a future increase in the number of base stations and/or network users assigned to a TAC is higher than anticipated, the air interface can quickly become overloaded, thus causing substantial performance degradation (e.g., an increase in paging discards, etc.). As such, unexpected increases in base station deployment and/or population growth can cause substantial network performance degradation unless accounted for during the initial TAC planning process.

Many conventional network operators performed TAC planning processes during the deployment of earlier generations of wireless technologies (e.g., Third Generation (3G) wireless technologies, Fourth Generation (4G) Long-Term Evolution (LTE) wireless technologies, etc.). Earlier generations of wireless technologies utilized a relatively sparse base station deployment pattern. In part, this sparse deployment pattern was enabled by the relatively large coverage area provided by base stations utilizing earlier generation wireless technologies. However, more modern wireless technologies, such as Fifth Generation (5G) New Radio (NR), leverage higher bands of frequency spectrum that provide less coverage and thus require a much denser distribution of base stations. For example, it is generally estimated that 5G technologies require around 300% more base stations than 4G technologies to establish the same area of coverage.

The increase in base station distribution density required by modern wireless technologies was unexpected by many network operators, and is thus likely to cause substantial disruptions to existing TAC plans. As such, other network operators (e.g., Hybrid Mobile Network Operators (HM-NOs)) without existing TAC plans, or those creating new TAC plans, desire a TAC planning process that is substantially more resistant to unexpected increases in population and/or base station density to avoid the substantial disruptions experienced by many network operators.

Accordingly, implementations of the present disclosure propose Voronoi tessellation for optimizing base station deployment in wireless networks. More specifically, a computing system associated with a network operator (e.g., an HMNO, a conventional network operator, a network service provider, etc.) can obtain information indicative of a plurality of sub-areas (e.g., counties, neighborhoods, states, etc.) of a geographic area (e.g., a county, a state, a country, etc.). Each of the sub-areas can be demarcated by an enclosed border. For example, if the geographic area is a state, and the sub-areas are counties within the state, each of the counties can be bounded by an enclosed border that defines the boundaries of the county.

For each of the sub-areas, the computing system can identify a set of internal borders. Each internal border can be a smaller size than a preceding border. In addition, each of the internal borders and the enclosed border can form a same shape. For example, if the enclosed border of the sub-area forms a triangle, each of the set of internal borders can also form triangles of the same proportions at different sizes.

The first border of the set of internal borders can be nested within the enclosed border of the sub-area. Each point of the first internal border can be located a certain distance from a corresponding point of the enclosed border. For example, assume that the enclosed border forms a 4 mile by 4 mile square. The first internal border can form a 3 mile by 3 mile square that is nested within the enclosed border, and each edge of the first internal border can be located one mile away from a corresponding edge of the enclosed border. The second internal border can form a 2 mile by 2 mile square that is nested within the first internal border, and each edge of the second internal border can be located one mile away from a corresponding edge of the first internal border.

The computing system can successively generate internal borders of the set of internal borders until space within the current internal border is insufficient to generate a subsequent internal border. More specifically, as the certain distance between each internal nested border is the same, the remaining space can be determined to be insufficient if an internal border cannot be established at the certain distance from the preceding internal border.

The computing system can select a set of points from points located along some (or all) of the set of internal borders. For example, the computing system may randomly select a set number of points from points on the set of internal borders. Alternatively, the computing system may perform some point selection process optimized for tessellation (e.g., Voronoi tessellation, some other tessellation process, etc.).

Once selected, the set of points can be utilized to perform a tessellation process to tessellate the sub-area enclosed by the enclosed border into a plurality of polygons. Each of the polygons can represent a corresponding candidate base station deployment site. More specifically, each polygon represents a TAC area to which a base station can be deployed. The computing system can then obtain information indicating a sequence of TACs assigned to the candidate base station deployment sites. Specifically, in some implementations, the computing system can sequentially assign TACs to each of the candidate base station deployment sites.

As described herein, a "candidate base station deployment site" generally refers to some portion of a geographic sub-area that can potentially be utilized for base station deployment in the future. Additionally, it should be noted that a base station, as described herein, generally refers to any type or manner of physical and/or virtualized network hardware and/or resources that implement a radio access node. Similarly, a "small cell," as described herein, refers to a type of base station deployed to implement modern wireless technologies that exhibits lower power consumption and range than preceding base stations. As such, the terms "base station" and "small cell" may be used interchangeably throughout the subject specification.

In some implementations, each candidate base station deployment site can have an assigned TAC. However, it should be noted that a base stations are not necessarily to be deployed to each candidate base station deployment site. Rather, a "candidate base station deployment site" may instead refer to some demarcated portion of land with an assigned TAC despite a base station not being deployed to the site.

In some implementations, the computing system can group the candidate base station deployment sites into base station clusters. For each cluster, the computing system can select one TAC assigned to one of the clustered base station deployment sites and re-assign that TAC to every other base station deployment site in the cluster. Subsequently, if base station deployment and/or population density increases within the geographic area associated with the cluster, the computing system can restore the TAC(s) initially assigned to some (or all) of the deployment sites within the cluster.

In such fashion, the computing system can perform a TAC planning process to generate TAC deployment information with a high degree of redundancy, thus substantially reducing, or eliminating, the probability of network performance degradation caused by overloaded TACs. More specifically, by tessellating each sub-area to generate large quantities of candidate deployment sites, and then clustering the deployment sites to reduce TAC quantity until such quantity is necessary, the computing system can generate a TAC plan with a high degree of redundancy that also enables the network operator to reduce (or increase) the granularity of the TAC plan at will.

Implementations of the present disclosure provide a number of technical effects and benefits. As one example technical effect and benefit, implementations described herein enable tessellation-based TAC planning with a high degree of redundancy. In addition, tessellation of the geographic area to identify candidate deployment sites enables a near homogenous distribution of square area per TAC without compromising on the unique shape and size of the geographic area for which the TACs are being planned. In turn, network operators (e.g., HMNOs) can provision TACs as needed based on the density of sites in a given area, while retaining the capability to "break down" a TAC into smaller TACs that have already been planned. Specifically, by establishing "TAC clusters" (i.e., small cell clusters), the network operator can iteratively split off clustered TACs to increase TAC capacity for a given area over time. This degree of planned granularity ensures that the TAC plan is substantially resistant to network performance degradation caused by unexpected growth within the geographic area.

FIG. 1 is a block diagram of an environment suitable for implementing Voronoi tessellation for optimizing base station deployment in wireless networks according to some implementations of the present disclosure. In some implementations, a computing system 10 includes processor device(s) 12 and memory 14. In some implementations, the computing system 10 may be a computing system that includes multiple computing devices. Alternatively, in some implementations, the computing system 10 may be one or more computing devices within a computing environment that includes multiple distributed devices and/or systems. Similarly, the processor device(s) 12 may include any computing or electronic device capable of executing software instructions to implement the functionality described herein.

The following description refers to network entities. As described herein, a network entity refers to any type or manner of entity that requests access to a network or a region of frequency spectrum. For example, a network entity may refer to network service providers (e.g., internet service providers, wireless telephony service providers, geolocation services, etc.), governmental organizations, medical personnel, private organizations, businesses, users (e.g., subscribers to network service providers), etc. The term network entity may also be interchangeably used herein to refer to device(s) used by the above-mentioned entities, such as user devices (e.g., smartphones, laptops, tablets, etc.), network devices (e.g., network nodes, endpoint devices, routers, modems, Cable Modem Termination Systems (CMTSs), etc.), network functions (e.g., SASs), etc.

Specifically, to demonstrate various implementations of the present disclosure more clearly, the computing system 10 is depicted as a computing system. However, the computing system 10 can be, or otherwise include, a variety of computing device(s) and/or network-specific device(s). Specifically, in some implementations, the computing system 10 can be, or otherwise include, a network node. The network node can perform various functions, and can include or otherwise implement various network functions. The network node can perform various functions, and can include or otherwise implement various network functions. For example, the network node may generate TAC information descriptive of a TAC plan. Alternatively, the network node may generate information that is utilized to create a TAC plan.

Alternatively, in some implementations, the computing system 10 can be a computing device or system that is communicatively coupled to a network node (e.g., via existing wired or wireless network infrastructure). For example, the computing system 10 can be a distributed network of computing device(s) and/or system(s) that collectively implement various wireless networking services of an Internet Service Provider (ISP).

The memory 14 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 14 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 14 can include a TAC planning module 16. The TAC planning module can be utilized to generate TAC information 18. The TAC information 18 can indicate TACs assigned to candidate base station sites. More specifically, the TAC planning module 16 can tessellate a geographic area to identify candidate base station sites within the geographic area, and can assign TACs to each candidate base station site.

To do so, the TAC planning module 16 can include a geographic information obtainer 20. The geographic information obtainer 20 can obtain geographic information 22. The geographic information 22 can indicate a plurality of sub-areas of a geographic area. As described herein, a geographic area can refer to any type or manner of geographic area that has been demarcated in some way. For example, the geographic area may refer to a country, state, etc. with clearly defined borders. For another example, the geographic area may refer to an area that has been arbitrarily or specifically demarcated by defined borders for the purposes of TAC planning (e.g., a border that divides a country into two geographic areas).

Similarly, as described herein, a geographic sub-area can refer to any type or manner of area within a geographic area that is demarcated by a closed border. For example, the counties of a state may be referred to as geographic sub-areas. For another example, the states of a country may be referred to as geographic sub-areas. For yet another example, an area such as a county may be further divided (e.g., on an arbitrary basis, on a per-neighborhood basis, on a political district basis, etc.), and each portion of the area can be referred to as a geographic sub-area.

The geographic information 22 can indicate, or otherwise describe, the enclosed border of each geographic sub-area. Additionally, in some implementations, the geographic information 22 can indicate other characteristics of the geographic area, such as population density, number of existing base stations (e.g., small cells, etc.), existing or planned base station sites, licensure information (e.g., whether the network operator owns a Priority Access License (PAL) within the geographic sub-area, etc.), etc. To follow the depicted example, the geographic information 22 can describe the enclosed borders of each geographic sub-area (e.g., county) within the geographic area of the state of Maine. For each county, the geographic information 22 can indicate whether a network operator associated with the computing system 10 owns a PAL license, a sequence identifier, and a description of the dimensions of the enclosed border that defines the boundaries of the county.

Specifically, in some implementations, the TAC planning module 16 can sequence geographic areas within a larger geographic area prior to initiating, or as part of, the TAC planning process. To do so, the TAC planning module 16 can include a geographic area/sub-area sequence identifier 24 (hereinafter, sequence identifier 24). The sequence identifier 24 can sequentially assign a sequential identifier to each geographic area within a larger geographic area. In some implementations, the sequence identifier 24 can utilize a vertical "zig-zag" pattern across a geographic region being sequenced.

For example, given the continental United States, the sequence identifier 24 may assign a first sequence identifier to the state of Washington, a second sequence identifier to the state of Oregon, etc. In this manner, the sequence identifier can ensure that each sequenced geographic area is physically proximate to the geographic area that was sequenced immediately prior. By sequencing for close spatial proximity, the sequence identifier 24 can enable network entities to more efficiently search for a mobile device based on the assigned TAC.

Additionally, or alternatively, in some implementations, the sequence identifier 24 can apply a sequence identifier to the geographic sub-areas. In some implementations, the sequence identifier 24 can apply sequence identifiers to the geographic sub-areas in the same manner as described with regards to the geographic area. For example, given the state of Washington, the sequence identifier 24 can apply a first sequence identifier to the county located in the top-left area of the state, a second sequence identifier to the county immediately south of the preceding county, etc. Alternatively, in some implementations, the sequence identifier 24 can first sequence geographic sub-areas with particular characteristics. For example, the sequence identifier can first sequence counties for which a PAL is owned by the network operator, and once sequence, can continue sequencing counties in the pattern described previously (or some other pattern). It should be noted that any type or manner of sequencing technique may be applied to the geographic areas and/or sub-areas, regardless of whether the sequencing technique is designed to encourage sequential proximity.

The TAC planning module 16 can include a tessellation module 25. The tessellation module 25 can tessellate a geographic sub-area to identify a plurality of polygons within the geographic sub-area. Each identified polygon can serve, or represent, a candidate base station site. It should be noted that any type or manner of tessellation process can be applied to the geographic sub-areas. For example, a tessellation process that accounts for population density, geographic area, etc. can be applied to each geographic sub-area. Alternatively, in some implementations, some space partitioning process other than tessellation can be applied to divide the sub-area into candidate base station sites.

In some implementations, the tessellation module 25 can include a Voronoi tessellator 26. The Voronoi tessellator 26 can apply a Voronoi tessellation process to each of the geographic sub-areas identified by the geographic information 22. Specifically, the Voronoi tessellator 26 can obtain information indicative of a plurality of points within a geographic sub-area, and can perform the Voronoi tessellation process based on the points. The Voronoi tessellation process can generate a Voronoi "cell", or polygon, for each point. Each polygon can consist of all points of the polygon being closer to the corresponding point than any other point.

In some implementations, the Voronoi tessellator 26 can obtain a plurality of points selected from points within a geographic sub-area by identifying internal borders nested within the enclosed border of the geographic sub-area. To do so, the tessellation module 25 can include an internal border identifier 28. The internal border identifier 28 can identify successively nested borders within each geographic sub-area indicated by the geographic information 22. More specifically, the internal border identifier 28 can generate internal border information 30. The internal border information 30 can include, indicate, or otherwise describe a set of internal borders that are successively nested within the enclosed border of a particular geographic sub-area.

Figure 2A:
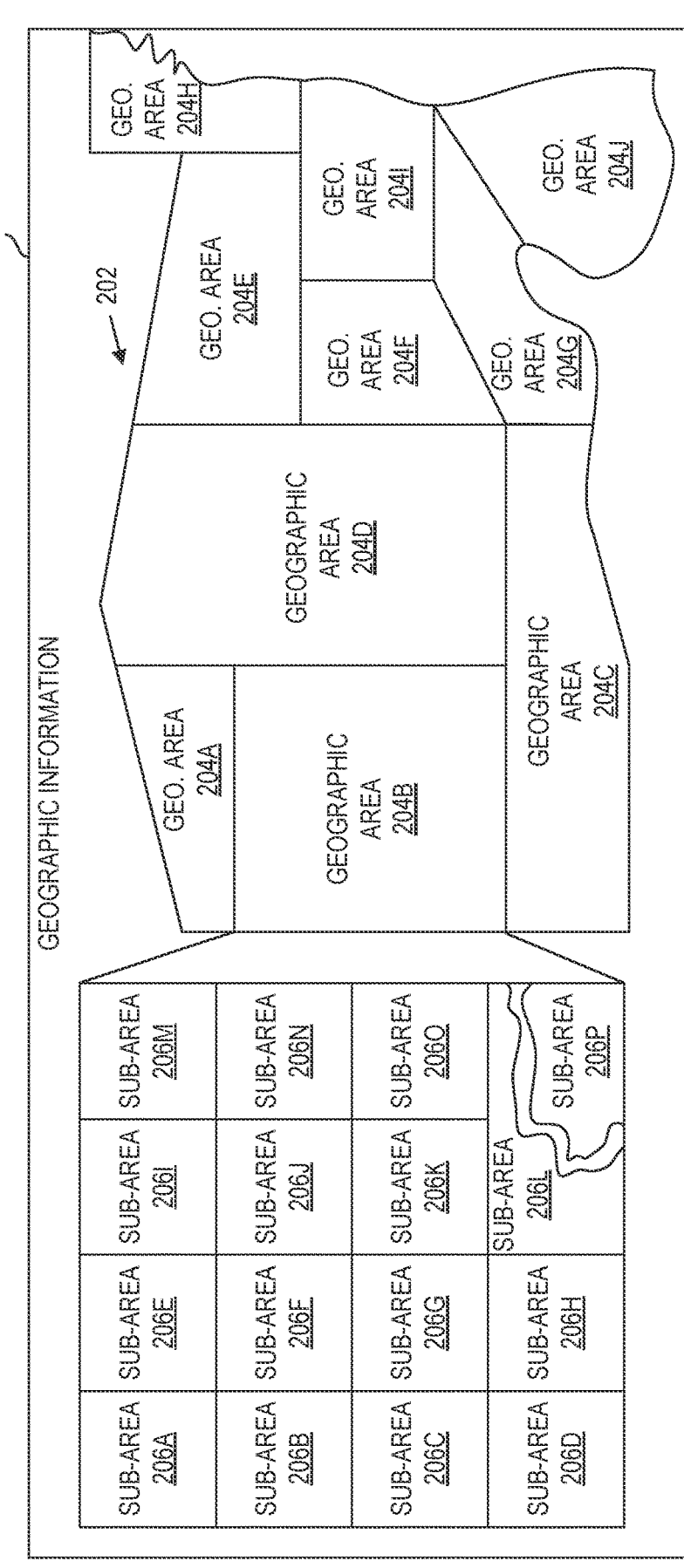
FIG. 2A illustrates an example geographic region indicated by the geographic information that includes geographic areas and geographic sub-areas according to some implementations of the present disclosure.

For example, turning to FIG. 2A, FIG. 2A illustrates an example geographic region indicated by the geographic information that includes geographic areas and geographic sub-areas according to some implementations of the present disclosure. FIG. 2A will be discussed in conjunction with FIG. 1. FIG. 2A illustrates a geographic region 202 (e.g., a country, a continent, etc.). The geographic region 202 includes a plurality of geographic areas 204A-204J (generally, geographic areas 204). Each geographic area can include one or more geographic sub-areas. To follow the depicted example, the geographic area 204B can include a plurality of geographic sub-areas 206A-206P (generally, geographic sub-areas 206).

It should be noted that, in some instances, geographic area(s) and/or geographic sub-area(s) may be bounded by enclosed borders that form non-geometric shapes. For example, although geographic sub-areas 206A-206K form geometric shapes (e.g., a square), geographic sub-areas 206L and 206P form non-geographic shapes due to a portion of the enclosed border of both geographic sub-areas being formed by a natural feature (e.g., a river) that is non-geometric. In conventional TAC planning processes, non-geometric borders can exacerbate the complexity of TAC planning, especially if network operators wish for each planned TAC to cover a certain physical area. However, implementations described herein utilize a tessellation process that can be applied with equal complexity to geometric borders and non-geometric borders, thus obviating a source of substantial complexity for the TAC planning process.

Turning to FIG. 2B, FIG. 2B illustrates a set of internal borders applied to a geographic sub-area of the geographic area of FIG. 2A according to some implementations of the present disclosure. FIG. 2B will be discussed in conjunction with FIGS. 1 and 2A. The geographic sub-area 206A of the geographic area 204B can be indicated or otherwise described by the geographic information 22. Specifically, the geographic information 22 can describe or otherwise indicate the dimensions, location, etc. of an enclosed border that defines the boundaries of the geographic sub-area 206A.

As depicted, the geographic sub-area 206A is bounded by an enclosed border 208. The enclosed border 208 can be described or otherwise indicated by the geographic information 22. The internal border identifier 28 can identify a set of internal borders 210A-210N (generally, the set of internal borders 210). More specifically, the internal border identifier 28 can identify a first internal border 210A of the set of internal borders. The first internal border 210A can form a same shape as the shape formed by a preceding border—in this case, the enclosed border 208 (e.g., a square).

In particular, although the shape, or proportions, of the first internal border 210A can be the same as those of the enclosed border 208, the size of the internal border 210A can be reduced so that the internal border can be evenly nested within the enclosed border 208. As described herein, "nested" generally refers to a closed border that is completely enclosed by a preceding border. As such, the terms "nested" and "internal" may be used interchangeably to refer to borders that have been identified within the space bounded by a preceding border.

In some implementations, the internal border identifier 28 can identify internal borders that are uniformly nested within the enclosed border 208 at regular intervals. Specifically, the internal border identifier 28 can identify the set of internal borders 210, and the points located along each border can be located a uniform distance from the immediately preceding border. In other words, each border in the set of internal borders 210 can be separated from an immediately preceding border.

To follow the depicted example, assume that distance indicator 212 indicates a uniform distance between two surfaces the indicator contacts. As depicted, each portion of each border of the set of internal borders 210 is located the uniform distance from a corresponding portion of a preceding border. To follow the depicted example, the bottom edge and the right edge of the internal border 210A are located the uniform distance from the enclosed border 208. The bottom edge and the right edge of the internal border 210B are located the uniform distance from the internal border 210C. The bottom edge and the right edge of the internal border 210C are located the uniform distance from the internal border 210D, etc.

In some implementations, the internal border identifier 28 can identify borders within the set of internal borders 210 until a quantity of space within the last identified border is insufficient to identify an additional border. More specifically, assume that the internal border identifier identifies a border N in the set of internal borders 210. The internal border identifier 28 can attempt to identify a subsequent border N+1 for inclusion in the set of internal borders 210. To identify the internal border N+1, a quantity of space sufficient to establish the buffer or distance indicated by the distance indicator 212 is required. If the quantity of space available within the subsequent border N+1 is insufficient to do so, the internal border identifier 28 can cease the border identification process.

To follow the illustrated example, assume that the internal border identifier 28 identifies the internal border 210F and attempts to identify a subsequent border nested within the internal border 210F. To identify the subsequent border, the internal border identifier 28 can first determine an internal distance 212 between edges of the internal border 210F. If the internal distance 212 is insufficient to establish the distance indicated by the distance indicator 212 at all points of the subsequent internal border, the internal border identifier 28 can refrain from identifying the subsequent internal border and cease the internal border identification process.

Returning to FIG. 1, the tessellation module 25 can include a point selector 32. The point selector 32 can select a plurality of points within a given geographic sub-area. The point selector 32 can generate point information 34 that indicates, or otherwise describes, the points and their corresponding locations relative to the enclosed border of the given geographic sub-area.

It should be noted that the point selector 32 can identify points in any manner, and/or based on any characteristics of the given geographic sub-area. For example, if the geographic sub-area includes natural features that would make base station deployment prohibitively difficult, the point selector 32 may refrain from selecting points in a manner that includes the natural features within a specific polygon.

In some implementations, the point selector 32 can randomly, or non-randomly, identify points along the set of internal borders identified by the internal border identifier 28. Specifically, turning to FIG. 2C, FIG. 2C illustrates a plurality of points selected from points along the set of internal borders of FIG. 2B according to some implementations of the present disclosure. FIG. 2C will be discussed in conjunction with FIGS. 1, 2A, and 2B. Specifically, the point selector 32 can select a plurality of points 214A-214E (generally, points 214).

The points selected for the plurality of points 214 can be selected from the points located along the set of internal borders 210. For example, points 214A and 214B can be selected from points located along the internal border 210A, point 214C can be selected from points located along the internal border 210B, point 214D can be selected from can be selected from points located along the internal border 210D, point 214E can be selected from points located along the internal border 210F, etc.

Once generated, the tessellation module 25 can, in conjunction with the Voronoi tessellator 26, utilize the points 214 to generate a plurality of polygons. In some implementations, the edges of the generated polygons can exceed the enclosed border of the given geographic sub-area. To remove edges that exceed the enclosed border, the tessellation module 25 can include polygon trimmer 36. The polygon trimmer 36 can "trim" or remove any portion of the generated polygons that exceed the enclosed border of the geographic sub-area. In this manner, the polygon trimmer 36 can ensure that the enclosed border acts as a constraining edge for any polygons adjacent to the enclosed border.

Each of the polygons generated using the tessellation module 25 can represent a corresponding candidate base station site. It should be noted that, in some implementations, the points 214 may not include a point located from one (or more) of the set of internal borders 210. For example, the points 214 do not include points located along the internal borders 210C and 210E. Similarly, in some implementations, the points 214 may include multiple points located on one of the set of internal borders 210. For example, the points 214A and 214B are both located along the internal border 210A.

Figure 2D:
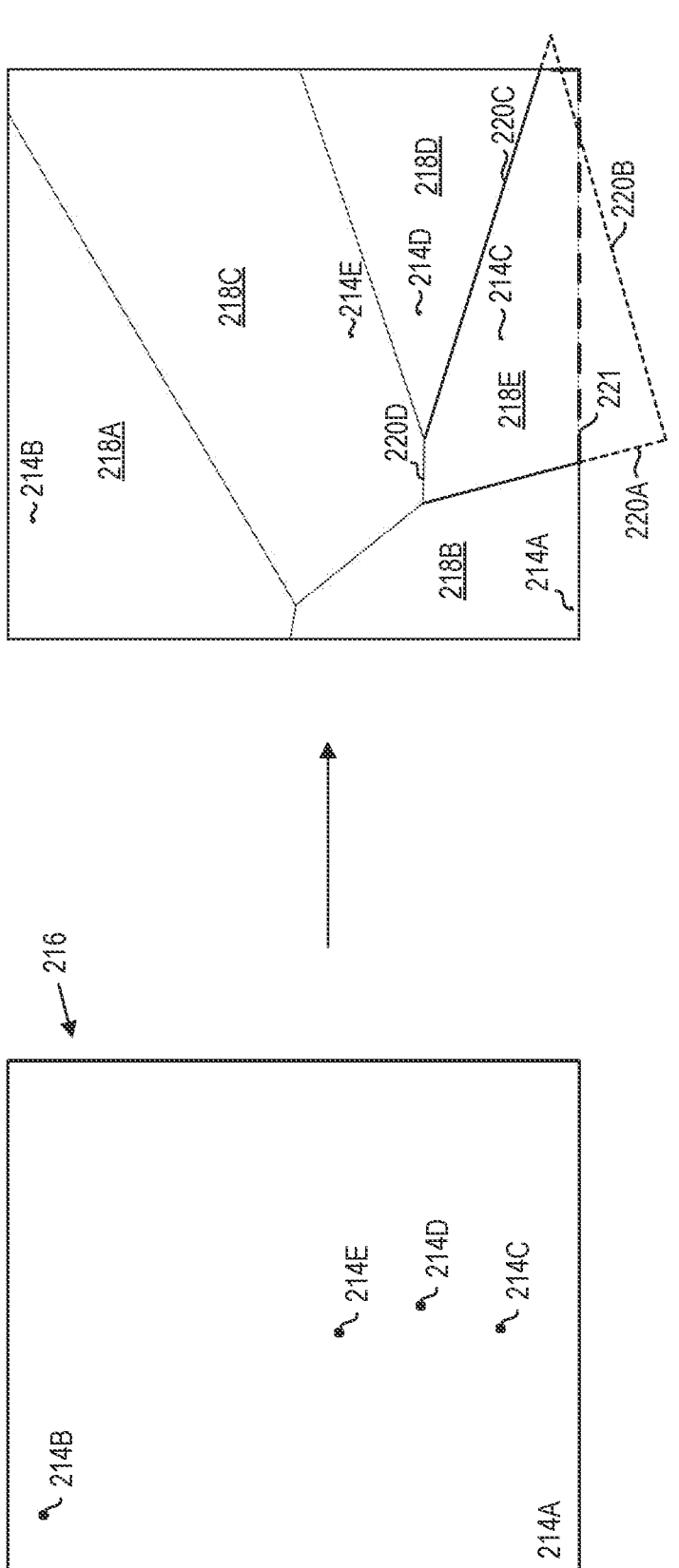
FIG. 2D illustrates a Voronoi tessellation process applied to a geographic sub-area based on the selected points of FIG. 2C according to some implementations of the present disclosure.

Turning to FIG. 2D, FIG. 2D illustrates a Voronoi tessellation process applied to a geographic sub-area based on the selected points of FIG. 2C according to some implementations of the present disclosure. FIG. 2D will be discussed in conjunction with FIGS. 1, 2A, 2B, and 2C. Specifically, once the points 214 are selected, the point selector 32 can generate point information 34 that identifies the location of the points 214 relative to the enclosed border 208.

Point information visualization 216 illustrates the information indicated by the point information 34. It should be noted that the point information visualization 216 does not necessarily depict the point information 34 itself. Rather, the point information visualization 216 merely provides an illustrative example of the information conveyed by the point information 34, and otherwise serves to more clearly illustrate the various implementations of the present disclosure described herein. As such, the point information visualization 216 does not illustrate the set of internal borders 210, as they can be discarded in some instances after identifying the points 214 (e.g., by deleting the internal border information 30). Alternatively, in some implementations, the internal border identifier 28 can retain the internal border information 30 for additional and/or remedial point selection.

Once generated, the point information 34 can be utilized by the Voronoi tessellator 26 to generate a plurality of polygons 218A-218E (generally, polygons 218. The polygons 218 can each include one of the points 214. In addition, as Voronoi polygons, each edge of the polygons 218 can be located closer to the point 214 included in the polygon than any other point external to the polygon. To follow the depicted example, each point of each edge of the polygon 218A can be located more closely to the point 214A. Similarly, each edge of the polygon 218B can be located more closely to the point 214A than any others of the points 214.

As described previously, in some implementations, the edges defining the polygons 218 generated by the tessellation module 25 can exceed the enclosed border 208 of the geographic sub-area 206A. To follow the depicted example, the polygon 218E is bounded by edges 220A-220D (generally, edges 220). Edges 220A, 220B, and 220C can each exceed the enclosed border 208 at certain points, and portions of edges 220A-220C that exceed the enclosed border 208 are depicted with dashed lines. As network operators generally wish to constrain TACs within the bounds of specific geographic sub-areas, the tessellation module can utilize the polygon trimmer 36 to trim those portions of the edges 220A-220C (e.g., the portions indicated by the dashed lines). Once trimmed, portion(s) of the edge 221 of the enclosed border 208 (e.g., indicated by the dash-and-circle line) can serve as a final edge to bound the area of the triangle otherwise bound by the edges 218A-218D.

It should be noted that, in some instances, the edge of a polygon that has exceeded the enclosed border of a geographic sub-area may further intrude back into the enclosed border of the geographic sub-area. In such instances, the polygon trimmer 36 can also trim those portions that intrude back into the geographic sub-area so that additional polygons bounded by the intruding portion and the edges of the enclosed border are not inadvertently created. To follow the depicted example, the edge 220B originates outside the enclosed border 208 and subsequently intrudes within the enclosed border 208 before again exiting. If untrimmed, the portion of the edge 220B that intrudes into the enclosed border 208 can inadvertently form a polygon between the intruding portion and the bottom right corner of the enclosed border 208. As such, the polygon trimmer 36 can trim the intruding portion of the edge 220B to ensure that additional polygons are not created inadvertently.

Returning to FIG. 1, the polygon trimmer 36 can perform any polygon modifications by modifying the point information 34 and/or TAC information 18. The TAC planning module 16 can include a TAC assigner 38. As described previously, each of the polygons identified by the tessellation module 25 can represent, or otherwise serve as, a candidate base station deployment site (e.g., a site to which a base station can be deployed in the future). The TAC assigner 38 can sequentially assign TACs to the candidate base station site deployment sites. For example, the TAC assigner 38 may sequentially assign the TACs to the candidate base station deployment sites in the same manner as described previously with regards to the sequence identifier 24 (e.g., starting from the top-left in a vertical "zig-zag" pattern).

The TAC assigner 38 can store the TAC assignments within the TAC information 18. The TAC information 18 can indicate the TAC assigned to each candidate base station deployment site. To follow the depicted example, the TAC information 18 can define a border/area for each of the candidate base station deployment sites. The TAC information 18 can also include a provisioned TAC for each of the base station deployment sites.

In some implementations, the TAC planning module 16 can include a clustering module 40. The clustering module 40 can cluster geographically proximate candidate base station deployment sites to form base station clusters within a given geographic sub-area. Such clusters can be utilized as individual TACs by assigning the same TAC to each candidate base station deployment site within the cluster. In some implementations, the clustering module 40 can identify the candidate base station deployment site in which the geometric centroid of the cluster is located. In other words, the clustering module 40 can form a cluster and identify the geometric centroid of the border formed by the edges of the cluster. Wherever the geometric centroid of the base station cluster boundary is calculated to be, the TAC initially provisioned to the candidate base station deployment site that includes the centroid can be assigned to the other sites within the cluster.

By assigning the same TAC to the entire base station cluster, the handoff efficiency between clusters can be improved, thus reducing the latency when a call is placed to a device as the device is travelling between clusters. Over time, additional base stations can be deployed to deployment sites, and deployment sites that include base stations can be removed from their cluster. The TACs that were previously provisioned to the base station deployment sites can be restored to sites that are removed from the cluster.

In some implementations, the clustering module 40 can generate propagation prediction information 42. The propagation prediction information 42 can describe a coverage polygon for each candidate base station deployment site. A coverage polygon is indicative of an area of coverage for which a deployed base station can service relative to the entry threshold established by a link budget utilized by the base station.

Once generated, the coverage polygons can be clustered for the purpose of deployment and optimization of the network. The coverage polygons of each site can be combined to form a polygon of coverage representing the entirety of the cluster. Using this coverage polygon, the geometric center of this polygon is calculated. Wherever this centroid is calculated to be, the candidate base station deployment site that includes the centroid can be selected as a representative base station deployment site. The TAC assigned to the representative base station deployment site can be further assigned to the other deployment sites within the cluster, thus replacing their initially provisioned TACs with the TAC of the representative base station deployment site. In this context, representative base station deployment site acts as the "container" for the centroid of base station clusters, and the location of the centroid relative to the TAC plan can delineate how the TAC is provisioned on both a cluster and site level.

It should be noted that the coverage polygons are not identical to the polygons generated via the tessellation module 25. Rather, the coverage polygons can be overlaid and clustered atop the generated polygons so that the generated polygon that includes the centroid of the clustered coverage polygons can be identified.

Alternatively, in some implementations, the candidate base station deployment sites can be clustered in some other manner. For example, assume that, once the candidate base station deployment sites are identified for each of the geographic sub-areas, the number of identified candidate base station deployment sites can be greater than needed. In response, the clustering module 40 can group candidate base station deployment sites into larger groupings of deployment sites and can assign the same TAC to each grouping of deployment sites as described previously.

The clustering module can determine the groupings of candidate base station deployment sites based on a number of candidate base station deployment sites included within each of the geographic sub-regions so that each grouping includes a similar number of sites. For example, assume that 10 candidate base station deployment sites are determined for a first, second, and third geographic sub-area, and that 40 candidate base station deployment sites are identified for a fifth geographic sub-area. If the desired number of deployment sites per grouping is 40, the clustering module can establish the fifth geographic sub-area as a grouping of candidate base station deployment sites, and can group the four other geographic sub-areas to form a second grouping of candidate base station deployment sites. In this manner, the network operator can ensure an even distribution of deployment sites per grouping.

In some implementations, the computing system 10 can provide the TAC information 18 to some other network entity 44 (e.g., a network node, a computing system or device associated with the network operator, etc.) to enable the current (or future) TAC planning.

FIG. 3 depicts a flow chart diagram of an example method 300 to perform Voronoi tessellation for optimizing base station deployment in wireless networks according to some implementations of the present disclosure. Although FIG. 3 depicts operations performed in a particular order for purposes of illustration and discussion, the methods of the present disclosure are not limited to the particularly illustrated order or arrangement. The various operations of the method 300 can be omitted, rearranged, combined, and/or adapted in various ways without deviating from the scope of the present disclosure.

At 302, a computing system can obtain information indicative of a plurality of sub-areas of a geographic area. Each of the plurality of sub-areas can be demarcated by a corresponding enclosed border of a plurality of enclosed borders.

At 304, the computing system can, for each sub-area of the plurality of sub-areas, identify a set of internal borders that are successively nested within the enclosed border of the sub-area. The enclosed border and the set of internal borders can each form a same shape. Each point of each internal border of the set of internal borders can be positioned a certain distance from a preceding internal border.

In some implementations, identifying the set of internal borders can include identifying a set of N internal borders that are successively nested within the enclosed border. The set of N borders can include a first internal border nested within the enclosed border. Each point of the first internal border is located a particular distance from a corresponding point of the enclosed border. The set of N borders can include a second internal border nested within the first internal border. Each point of the second internal border can be located the particular distance from a corresponding point of the first nested border. The computing system can determine that a quantity of space within an internal border N of the set of N borders is less than a quantity of space necessary to identify an internal border N+1 with points located the particular distance from corresponding points of the internal border N.

At 306, the computing system can, for each sub-area of the plurality of sub-areas, select a set of points from points located along one or more internal borders of the set of internal borders.

At 308, the computing system can, for each sub-area of the plurality of sub-areas, based on the set of points, perform a tessellation process to tessellate the sub-area into a plurality of polygons within the enclosed border. Each polygon of the plurality of polygons can represent a corresponding candidate base station deployment site of a plurality of candidate base station deployment sites.

In some implementations, the computing system can perform a Voronoi tessellation process to tessellate the sub-area into a plurality of Voronoi polygons within the enclosed border, each Voronoi polygon of the plurality of Voronoi polygons being representative of a corresponding candidate base station deployment site of a plurality of candidate base station deployment sites.

At 310, the computing system can, for each sub-area of the plurality of sub-areas, obtain information indicative of a plurality of Tracking Area Codes (TACs) assigned to the plurality of candidate base station deployment sites. In some implementations, to obtain the information, the computing system can generate TAC assignment information that assigns each TAC of the plurality of TACs to a corresponding candidate base station deployment site of the plurality of candidate base station deployment sites.

In some implementations, obtaining the information can include clustering the plurality of candidate base station deployment sites to generate information indicative of a plurality of deployment site clusters. For each deployment site cluster of the plurality of deployment site clusters, the computing system can select a first candidate base station deployment site from the deployment site cluster. The computing system can assign a first TAC of the plurality of TACs to each candidate base station deployment site of the deployment site cluster. The first TAC of the plurality of TACs is associated with the first candidate base station deployment site.

In some implementations, selecting the first candidate base station deployment site from the deployment site cluster can include obtaining coverage prediction information indicative of a predicted area of base station coverage for base stations deployed to each candidate base station deployment site of the deployment site cluster. The computing system can determine a coverage polygon that includes the predicted area of base station coverage. The computing system can determine that a geometric centroid of the coverage polygon is located within the first candidate base station deployment site.

In some implementations, the computing system can obtain information indicative of a request for TAC densification within a first sub-area of the plurality of sub-areas of the geographic area. The computing system can determine that a particular TAC is assigned to a subset of candidate base station deployment sites within the first sub-area. Based on the TAC assignment information, computing system can assign a provisioned TAC to a particular candidate base station deployment site of the subset of candidate base station deployment sites. The provisioned TAC can be one of a plurality of provisioned TACS that are provisioned for the first sub-area.

In some implementations, the TAC assignment information assigns the provisioned TAC to the particular candidate base station deployment site. In some implementations, obtaining the information can include determining a plurality of sequential sub-area identifiers corresponding to the plurality of sub-areas of the geographic area. In some implementations, the computing system can detect ownership of a PAL for a particular sub-area of the plurality of sub-areas. The computing system can allocate a first sequential sub-area identifier of the plurality of sequential sub-area identifiers to the particular sub-area.

In some implementations, to generate the TAC information, the computing system can allocate a sequence of candidate TACs for the sub-area. The sequence of candidate TACs can include at least one candidate TAC for each candidate base station deployment site of the plurality of candidate base station deployment sites. The sequence of candidate TACs can be based at least in part on the sequential sub-identifier of the plurality of sequential sub-identifiers that corresponds to the sub-area.

In some implementations, the geographic area can include a state, and the plurality of sub-areas can respectively include a plurality of counties of the state. In some implementations, the geographic area can include a country, and the plurality of sub-areas can respectively include a plurality of states of the country.

Figure 4:
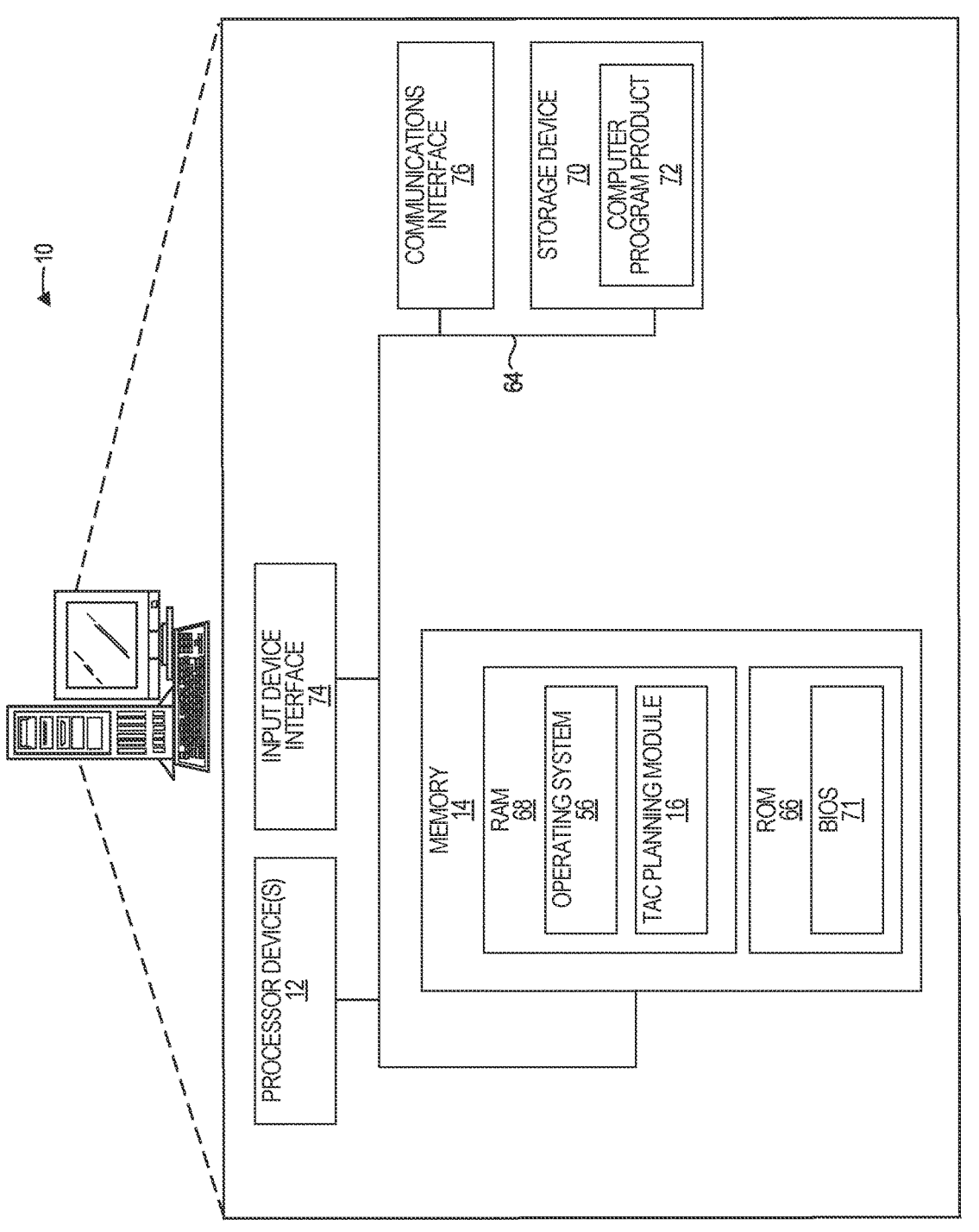
FIG. 4 is a block diagram of the computing system suitable for implementing examples according to one example.

FIG. 4 is a block diagram of the computing system 10 suitable for implementing examples according to one example. The computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 10 includes the processor device (s) 12, the memory 14, and a system bus 64. The system bus 64 provides an interface for system components including, but not limited to, the memory 14 and the processor device (s) 12. The processor device(s) 12 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 14 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 71 may be stored in the non-volatile memory 66 and can include the basic routines that help to transfer information between elements within the computing system 10. The volatile memory 68 may also include a high-speed RAM, such as static RAM, for caching data.

The computing system 10 may further include or be coupled to a non-transitory computer-readable storage medium such as the storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 70 and other drives associated with computer-readable media and computer-usable media may provide non-volatile storage of data, data structures, computer-executable instructions, and the like.

A number of modules can be stored in the storage device 70 and in the volatile memory 68, including an operating system and one or more program modules, such as the TAC planning module 16, which may implement the functionality described herein in whole or in part. All or a portion of the examples may be implemented as a computer program product 72 stored on a transitory or non-transitory computer-usable or computer-readable storage medium, such as the storage device 70, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the TAC planning module 16 in the volatile memory 68, may serve as a controller, or control system, for the computing system 10 that is to implement the functionality described herein.

Because the TAC planning module 16 is a component of the computing system 10, functionality implemented by the TAC planning module 16 may be attributed to the computing system 10 generally. Moreover, in examples where the TAC planning module 16 comprises software instructions that program the processor device(s) 12 to carry out functionality discussed herein, functionality implemented by the TAC planning module 16 may be attributed herein to the processor device(s) 12.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 74 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing system 10 may also include a communications interface 76 suitable for communicating with the network as appropriate or desired. The computing device 10 may also include a video port configured to interface with the display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

obtaining, by a computing system comprising one or more processor devices, information indicative of a plurality of sub-areas of a geographic area, wherein each of the plurality of sub-areas are demarcated by a corresponding enclosed border of a plurality of enclosed borders;

for each sub-area of the plurality of sub-areas:

identifying, by the computing system, a set of internal borders that are successively nested within the enclosed border of the sub-area, wherein the enclosed border and the set of internal borders each form a same shape, and wherein each point of each internal border of the set of internal borders is positioned a certain distance from a preceding internal border;

selecting, by the computing system, a set of points from points located along one or more internal borders of the set of internal borders;

based on the set of points, performing, by the computing system, a tessellation process to tessellate the sub-area into a plurality of polygons within the enclosed border, each polygon of the plurality of polygons being representative of a corresponding candidate base station deployment site of a plurality of candidate base station deployment sites; and obtaining, by the computing system, Tracking Area Code (TAC) information indicative of a plurality of TACs assigned to the plurality of candidate base station deployment sites.

2. The method of claim 1, wherein obtaining the TAC information indicative of the plurality of TACs assigned to the plurality of candidate base station deployment sites comprises:

generating, by the computing system, the TAC information, wherein the TAC information assigns each TAC of the plurality of TACs to a corresponding candidate base station deployment site of the plurality of candidate base station deployment sites.

3. The method of claim 2, wherein obtaining the TAC information indicative of the plurality of TACs assigned to the plurality of candidate base station deployment sites further comprises:

clustering, by the computing system, the plurality of candidate base station deployment sites to generate information indicative of a plurality of deployment site clusters;

for each deployment site cluster of the plurality of deployment site clusters:

selecting, by the computing system, a first candidate base station deployment site from the deployment site cluster; and assigning, by the computing system, a first TAC of the plurality of TACs to each candidate base station deployment site of the deployment site cluster, wherein the first TAC of the plurality of TACs is associated with the first candidate base station deployment site.

4. The method of claim 3, wherein selecting the first candidate base station deployment site from the deployment site cluster comprises:

obtaining, by the computing system, coverage prediction information indicative of a predicted area of base station coverage for base stations deployed to each candidate base station deployment site of the deployment site cluster;

determining, by the computing system, a coverage polygon that comprises the predicted area of base station coverage; and determining, by the computing system, that a geometric centroid of the coverage polygon is located within the first candidate base station deployment site.

5. The method of claim 3, wherein the method further comprises:

obtaining, by the computing system, information indicative of a request for TAC densification within a first sub-area of the plurality of sub-areas of the geographic area;

determining, by the computing system, that a particular TAC is assigned to a subset of candidate base station deployment sites within the first sub-area; and based on the TAC information, assigning, by the computing system, a provisioned TAC to a particular candidate base station deployment site of the subset of candidate base station deployment sites, wherein the provisioned TAC is one of a plurality of provisioned TACS that are provisioned for the first sub-area.

6. The method of claim 5, wherein the TAC information assigns the provisioned TAC to the particular candidate base station deployment site.

7. The method of claim 2, wherein obtaining the information indicative of the plurality of sub-areas of the geographic area comprises:

determining, by the computing system, a plurality of sequential sub-area identifiers corresponding to the plurality of sub-areas of the geographic area.

8. The method of claim 7, wherein determining the plurality of sequential sub-area identifiers comprises:

detecting, by the computing system, ownership of a Priority Access License (PAL) for a particular sub-area of the plurality of sub-areas; and allocating, by the computing system, a first sequential sub-area identifier of the plurality of sequential sub-area identifiers to the particular sub-area.

9. The method of claim 7, wherein generating the TAC information that assigns each TAC of the plurality of TACs to the corresponding candidate base station deployment site of the plurality of candidate base station deployment sites comprises:

for each sub-area of the plurality of sub-areas:

allocating, by the computing system, a sequence of candidate TACs for the sub-area, wherein the sequence of candidate TACs comprises at least one candidate TAC for each candidate base station deployment site of the plurality of candidate base station deployment sites, and wherein the sequence of candidate TACs is based at least in part on a sequential sub-identifier assigned to the sub-area of a plurality of sequential sub-identifiers respectively assigned to the plurality of sub-areas.

10. The method of claim 1, wherein identifying the set of internal borders that are successively nested within the enclosed border of the sub-area comprises:

identifying, by the computing system, a set of N internal borders that are successively nested within the enclosed border, wherein the enclosed border and each border of the set of N internal borders forms the same shape, and wherein the set of N borders comprises:

a first internal border nested within the enclosed border, wherein each point of the first internal border is located a particular distance from a corresponding point of the enclosed border; and a second internal border nested within the first internal border, wherein each point of the second internal border is located the particular distance from a corresponding point of the first internal border; and determining, by the computing system, that a quantity of space within an internal border N of the set of N borders is less than a quantity of space necessary to identify an internal border N+1 with points located the particular distance from corresponding points of the internal border N.

11. The method of claim 1, wherein the geographic area comprises a state, and wherein the plurality of sub-areas respectively comprise a plurality of counties of the state.

12. The method of claim 1, wherein the geographic area comprises a country, and wherein the plurality of sub-areas respectively comprise a plurality of states of the country.

13. The method of claim 1, wherein performing the tessellation process comprises:

performing, by the computing system, a Voronoi tessellation process to tessellate the sub-area into a plurality of Voronoi polygons within the enclosed border, each Voronoi polygon of the plurality of Voronoi polygons being representative of a corresponding candidate base station deployment site of a plurality of candidate base station deployment sites.

14. A computing system comprising:

one or more computing devices configured to:

obtain information indicative of a plurality of sub-areas of a geographic area, wherein each of the plurality of sub-areas are demarcated by a corresponding enclosed border of a plurality of enclosed borders;

for each sub-area of the plurality of sub-areas:

identify a set of internal borders that are successively nested within the enclosed border of the sub-area, wherein the enclosed border and the set of internal borders each form a same shape, and wherein each point of each internal border of the set of internal borders is positioned a certain distance from a preceding internal border;

select a set of points from points located along one or more internal borders of the set of internal borders;

based on the set of points, perform a tessellation process to tessellate the sub-area into a plurality of polygons within the enclosed border, each polygon of the plurality of polygons being representative of a corresponding candidate base station deployment site of a plurality of candidate base station deployment sites; and obtain Tracking Area Code (TAC) information indicative of a plurality of TACs assigned to the plurality of candidate base station deployment sites.

15. The computing system of claim 14, wherein obtaining the TAC information indicative of the plurality of TACs assigned to the plurality of candidate base station deployment sites comprises:

generating the TAC information, wherein the TAC information assigns each TAC of the plurality of TACs to a corresponding candidate base station deployment site of the plurality of candidate base station deployment sites.

16. The computing system of claim 15, wherein obtaining the TAC information indicative of the plurality of TACs assigned to the plurality of candidate base station deployment sites further comprises:

clustering the plurality of candidate base station deployment sites to generate information indicative of a plurality of deployment site clusters;

for each deployment site cluster of the plurality of deployment site clusters:

selecting a first candidate base station deployment site from the deployment site cluster; and assigning a first TAC of the plurality of TACs to each candidate base station deployment site of the deployment site cluster, wherein the first TAC of the plurality of TACs is associated with the first candidate base station deployment site.

17. The computing system of claim 16, wherein selecting the first candidate base station deployment site from the deployment site cluster comprises:

obtaining coverage prediction information indicative of a predicted area of base station coverage for base stations deployed to each candidate base station deployment site of the deployment site cluster;

determining a coverage polygon that comprises the predicted area of base station coverage; and determining that a geometric centroid of the coverage polygon is located within the first candidate base station deployment site.

18. The computing system of claim 16, wherein the one or more computing devices are further configured to:

obtain information indicative of a request for TAC densification within a first sub-area of the plurality of sub-areas of the geographic area;

determine that a particular TAC is assigned to a subset of candidate base station deployment sites within the first sub-area; and based on the TAC information, assign a provisioned TAC to a particular candidate base station deployment site of the subset of candidate base station deployment sites, wherein the provisioned TAC is one of a plurality of provisioned TACS that are provisioned for the first sub-area.

19. The computing system of claim 18, wherein the TAC information assigns the provisioned TAC to the particular candidate base station deployment site.

20. A non-transitory computer-readable storage medium that includes executable instructions configured to cause one or more processor devices to:

obtain information indicative of a plurality of sub-areas of a geographic area, wherein each of the plurality of sub-areas are demarcated by a corresponding enclosed border of a plurality of enclosed borders;

for each sub-area of the plurality of sub-areas:

identify a set of internal borders that are successively nested within the enclosed border of the sub-area, wherein the enclosed border and the set of internal borders each form a same shape, and wherein each point of each internal border of the set of internal borders is positioned a certain distance from a preceding internal border;

select a set of points from points located along one or more internal borders of the set of internal borders;

based on the set of points, perform a tessellation process to tessellate the sub-area into a plurality of polygons within the enclosed border, each polygon of the plurality of polygons being representative of a corresponding candidate base station deployment site of a plurality of candidate base station deployment sites; and obtain Tracking Area Code (TAC) information indicative of a plurality of TACs assigned to the plurality of candidate base station deployment sites.

* * * * *